(12) United States Patent
Beskales et al.

(10) Patent No.: US 10,877,948 B1
(45) Date of Patent: Dec. 29, 2020

(54) METHOD AND COMPUTER PROGRAM PRODUCT FOR GEOSPATIAL BINNING

(71) Applicant: Tamr, Inc., Cambridge, MA (US)

(72) Inventors: George Anwar Dany Beskales, Waltham, MA (US); Nikolaus Bates-Haus, Littleton, MA (US)

(73) Assignee: TAMR, INC., Cambridge, MA (US)

( * ) Notice: Subject to any disclaimer, the term of this patent is extended or adjusted under 35 U.S.C. 154(b) by 0 days.

(21) Appl. No.: 16/918,158

(22) Filed: Jul. 1, 2020

(51) Int. Cl.
*G06F 16/215* (2019.01)
*G06F 16/28* (2019.01)
*G06F 16/29* (2019.01)

(52) U.S. Cl.
CPC .......... *G06F 16/215* (2019.01); *G06F 16/285* (2019.01); *G06F 16/29* (2019.01)

(58) Field of Classification Search
CPC ....... G06F 16/215; G06F 16/285; G06F 16/29
See application file for complete search history.

(56) References Cited

U.S. PATENT DOCUMENTS

| | | | |
|---|---|---|---|
| 6,975,318 B2 | 12/2005 | Junkins et al. | |
| 7,430,340 B2 | 9/2008 | Glass et al. | |
| 7,966,327 B2 | 6/2011 | Li et al. | |
| 8,321,509 B2 | 11/2012 | Jennings et al. | |
| 9,122,639 B2 | 9/2015 | Kennedy et al. | |
| 9,268,786 B2 | 2/2016 | Aronovich | |
| 9,317,532 B2 * | 4/2016 | Lahcanski | G06F 16/35 |
| 9,842,380 B2 | 12/2017 | Rasmussen et al. | |
| 10,304,237 B2 * | 5/2019 | Sequeira | G01C 21/206 |
| 10,613,785 B1 | 4/2020 | Beskales et al. | |
| 2004/0203928 A1 | 10/2004 | Nevin et al. | |
| 2006/0101060 A1 * | 5/2006 | Li | G06F 16/583 |
| 2010/0141666 A1 * | 6/2010 | Christopher | G06T 13/20 345/520 |
| 2011/0280453 A1 * | 11/2011 | Chen | G06T 7/75 382/113 |
| 2016/0328661 A1 * | 11/2016 | Reese | G06N 20/00 |
| 2017/0011091 A1 * | 1/2017 | Chehreghani | G06F 16/22 |
| 2017/0211941 A1 * | 7/2017 | Thom | G01C 21/367 |
| 2017/0242133 A1 * | 8/2017 | Yilmaz | G01S 19/26 |
| 2018/0113767 A1 | 4/2018 | Pogosyan et al. | |
| 2018/0349954 A1 * | 12/2018 | Mehta | H04L 67/18 |
| 2020/0065405 A1 * | 2/2020 | Gandenberger | G06F 16/9024 |
| 2020/0265089 A1 * | 8/2020 | Zhang | G06F 16/901 |

(Continued)

OTHER PUBLICATIONS

Bhagwat et al., "Extreme binning: scalable, parallel deduplication for chunk-based file backup," Proceedings of the 17th IEEE International Symposium on Modeling, Analysis, and Simulation of Computer and Telecommunication Systems (MASCOTS 2009), Sep. 2009. Downloaded from: <https://www.ssrc.ucsc.edu/Papers/bhagwat-mascots09.pdf>, 9 pages.

(Continued)

*Primary Examiner* — Huawen A Peng
(74) *Attorney, Agent, or Firm* — Panitch Schwarze Belisario & Nadel LLP

(57) ABSTRACT

Given a local distance metric for geospatial features, a binning is produced that is guaranteed to label features within a given distance threshold with the same bin, while labeling a minimum number of features separated by a distance that is greater than the threshold with the same bin.

10 Claims, 5 Drawing Sheets

(56) References Cited

U.S. PATENT DOCUMENTS

2020/0311565 A1* 10/2020 Beller .................... G06F 16/93

OTHER PUBLICATIONS

Georgios Lamprianidis, "Advanced techniques and algorithms to collect, analyze and visualize spatiotemporal data from social media feeds," PhD Thesis of Georgios Lamprianidis, National Technical University of Athens, School of Electrical and Computer Engineering, Division of Computer Science, Jun. 30, 2016, download from: <https://core.ac.uk/download/pdf/81560962.pdf>, 149 pages.
OpenGIS® Implementation Standard for Geographic information—Simple feature access—Part 1: Common architecture. Copyright © 2010 Open Geospatial Consortium, Inc., 93 pages.

* cited by examiner

METHOD AND COMPUTER PROGRAM PRODUCT FOR GEOSPATIAL BINNING

GOVERNMENT LICENSE RIGHTS

This invention was made with Government support under Contract No. 2014-14031000011 awarded by the Central Intelligence Agency. The Government has certain rights in the invention.

BACKGROUND OF THE INVENTION

1. Field of Invention

This is related to geospatial information systems, and more particularly to finding all geospatial features that lie within a distance threshold of each other.

2. Background

The present invention is related to, but distinct from, binning in maps or other geographic information system (GIS) systems. Binning in maps or other GIS systems is a way of aggregating detailed information for summary display. The binning described herein is data binning that allows for overlapping bins and is intended to support operations such as data deduplication.

The problem of duplicate elimination is to detect all pairs of records in a given data set that are highly similar, according to some similarity function. One of the main challenges is to obtain all similar record pairs, according to some similarity function, without exhaustive enumeration of all record pairs. Binning is the process of assigning the input records to (possibly overlapping) bins such that all similar record pairs appear in the same bin. All record pairs that belong to different bins can then be pruned. This allows a computer system to perform computationally faster data deduplication. U.S. Pat. No. 10,613,785 (Beskales et al.) entitled "Scalable Binning for Big Data Deduplication" describes a system for doing this at large data scale for string, text and numeric attributes.

It would be desirable to provide an extension of the system in U.S. Pat. No. 10,613,785 that can handle geospatial information, namely, points, lines and polygons located on the surface of the earth. The present invention fulfills this need.

BRIEF SUMMARY OF THE INVENTION

Given a local distance metric for geospatial features, a binning is produced that is guaranteed to label features within a given distance threshold with the same bin, while labeling a minimum number of features separated by a distance that is greater than the threshold with the same bin.

The overall workflow is as follows:
1. Gather parameters:
    a. distance function distance (p, q) that gives a distance between two features
    b. distance threshold T
    c. bin length parameter λ
    d. size threshold between small and medium bins
    e. size threshold between medium and large bins
2. For each feature:
    a. Compute bins and store them in a binning dataset
3. For each bin:
    a. Compute whether it is small, medium, or large
    b. Store bin statistics in a bin statistics dataset
4. For all small bins:
    a. Compute the set of distinct pairs within all small bins
    b. Filter out all pairs with distance larger than T
    c. Store the remaining pairs in the pairs dataset
5. For each medium bin:
    a. Fetch all features from the binning dataset for the selected bin
    b. Compute the set of distinct pairs of features within the bin
    c. Compute the distance between features in each pair using the distance function
    d. Filter out all pairs with distance larger than T
    e. Store the remaining pairs in the pairs dataset
6. For each large bin:
    a. Partition the bin into medium sub-bins.
    b. Iterate over sub-bins. For each sub-bin:
        i. Compute the set of distinct pairs within the sub-bin
        ii. Filter out all pairs with distance larger than T
        iii. Store the remaining pairs in the pairs dataset
    c. Iterate over all pairs of distinct sub-bins. For each pair of sub-bins:
        i. Compute the set of distinct pairs of features, where each feature comes from a distinct sub-bin
        ii. Filter out all pairs with distance larger than T
        iii. Store the remaining pairs in the pairs dataset
7. Remove all duplicate pairs from the pairs dataset; a duplicate pair is one that has the same two features as another pair The resulting pairs dataset contains all distinct pairs that satisfy the requirement that the features be within distance threshold T. This dataset can be used for example for highly efficient data deduplication at large scale.

Note that geospatial binning can be combined with other types of attribute binning using the techniques described in U.S. Pat. No. 10,613,785.

BRIEF DESCRIPTION OF THE DRAWINGS

Preferred embodiments of the present invention will now be described by way of example with reference to the accompanying drawings.

DETAILED DESCRIPTION OF THE INVENTION

Certain terminology is used herein for convenience only and is not to be taken as a limitation on the present invention. The words "a" and "an", as used in the claims and in the corresponding portions of the specification, mean "at least one."

I. Terminology and Definitions

The following terminology and definitions are provided to promote understanding of the present invention. The terminology and definitions of the prior art are not necessarily consistent with the terminology and definitions of the present invention. Where there is conflict, the following terminology and definitions apply.

Feature: a geographic feature used in geographic information systems. An example is the storage and access model of mostly two-dimensional geometries used in geographic information systems, as defined in ISO 19125-1:2004 Geographic information—Simple feature access—Part 1: Common architecture. Relevant to this document is that a feature is associated with a geometry.

Feature Collection: a collection of features wherein each feature is associated with an identifier, and each identifier is associated with exactly one feature.

Geometry: a representation of a two-dimensional geometry used in geographic information systems, as defined in ISO 19125-1:2004 Geographic information—Simple feature access—Part 1: Common architecture. In particular, a geometry may be a point, a multi-point, a line-string, a multi-line-string, a polygon, or a multi-polygon, arranged relative to the surface of the earth or another body.

Point: a location as used in geographic information systems, as defined in ISO 19125-1:2004 Geographic information—Simple feature access—Part 1: Common architecture. A point may have two coordinates indicating latitude and longitude, or three coordinates indicating latitude, longitude and altitude.

Bin: a logical organization of values into a group, and an identifier for that group. A value that is organized into a group is described as "being labeled with", "belonging to", or "being in" that group's bin. A value may belong to more than one bin. Retrieving a bin implies retrieving the values that have been logically grouped into the bin. Different types of bins group different types of values. For example, numeric bins group numeric values, spatial bins group points, and feature bins group features.

Pair: a set of two distinct features.

Distinct Pair: a pair within a collection of pairs where the two features appearing in the pair do not appear together in any other pair.

Duplicate Pair: a pair within a collection of pairs where the two features appearing in the pair also appear together in at least one additional pair.

II. Overview of Preferred Embodiments

Figure 1:
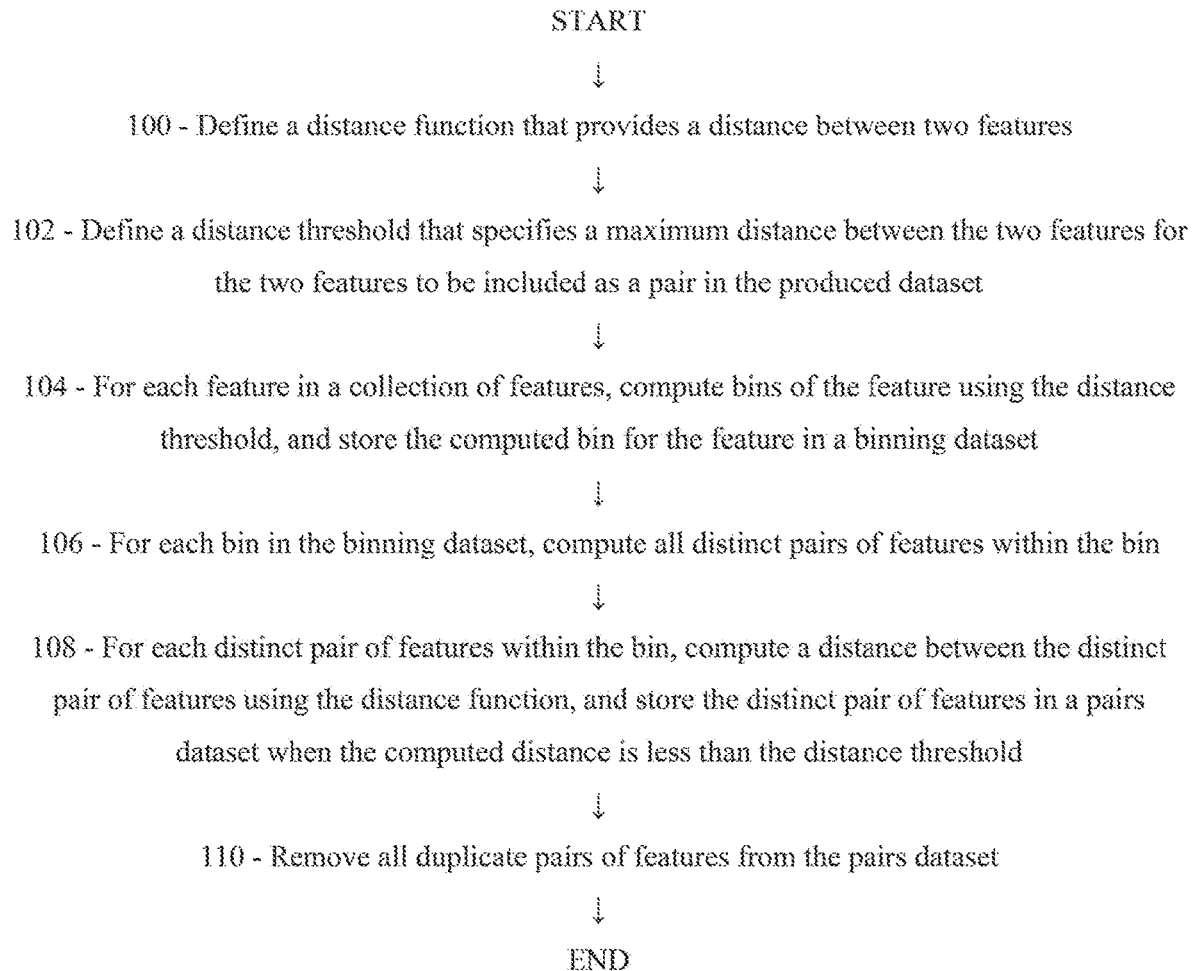
FIG. 1 is a flowchart of one preferred embodiment of the present invention.
Figure 2:
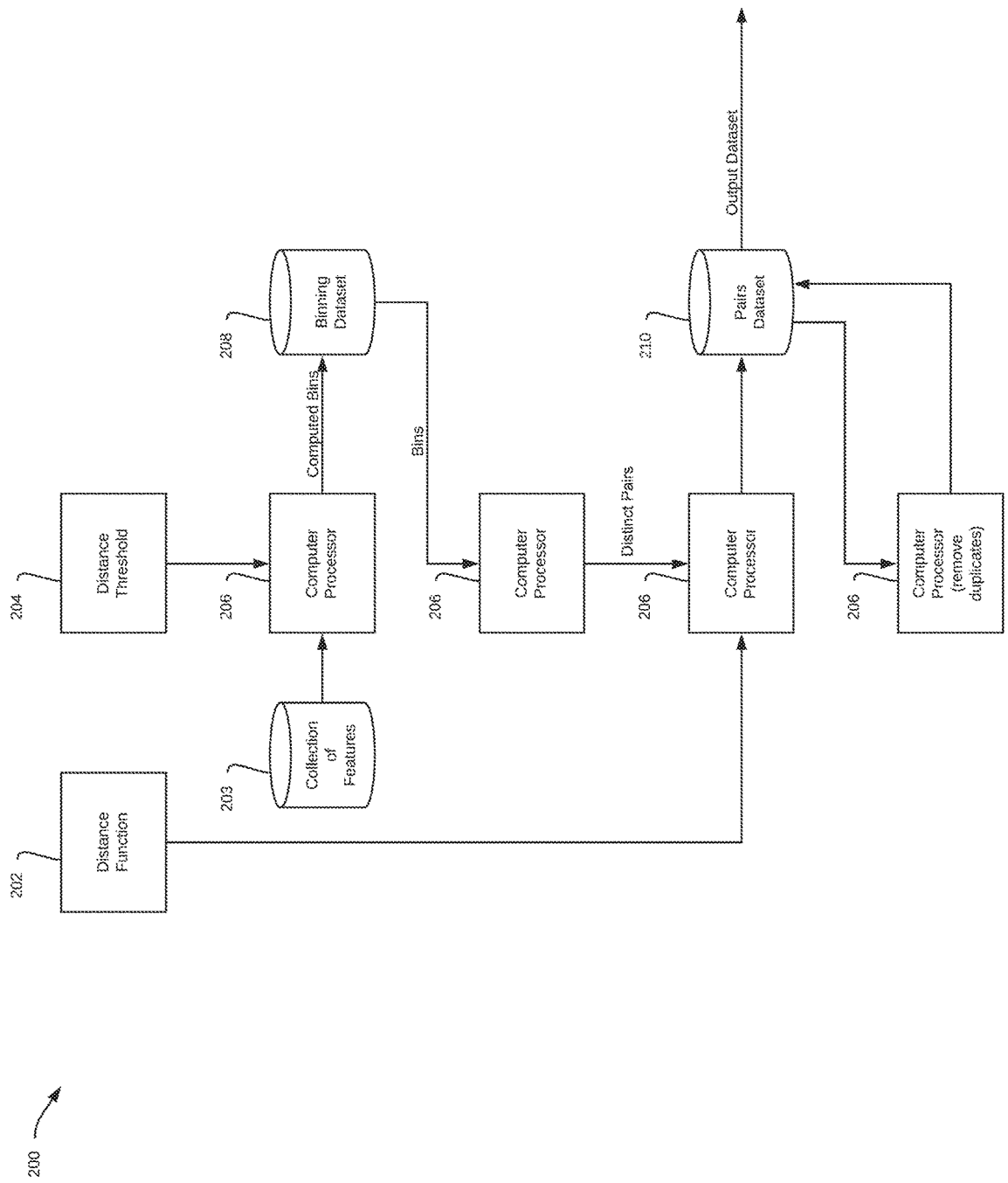
FIG. 2 is a schematic diagram of a system for implementing the FIG. 1 embodiment.

FIG. 1 is a flowchart of one preferred embodiment of the present invention which is a computer-implemented method for producing a dataset of all distinct pairs of features where a distance between the features in each pair is less than a distance threshold. FIG. 2 is a schematic diagram of a system 200 for implementing the method. Referring to the steps of FIG. 1 and the elements of FIG. 2, the method operates as follows:

Step 100: A distance function 202 is defined that provides a distance between two features.

Step 102: A distance threshold 204 is defined that specifies a maximum distance between the two features for the two features to be included as a pair in the produced dataset.

Step 104: For each feature in a collection of features 203, compute, by software executing on computer processor 206, bins of the feature using the distance threshold, and store the computed bins for the feature in a binning dataset 208.

Step 106: For each bin in the binning dataset, compute, by the software executing on the computer processor 206, all distinct pairs of features within the bin.

Step 108: For each distinct pair of features within the bin, compute, by the software executing on the computer processor 206, a distance between the distinct pair of features using the distance function, and store the distinct pair of features in a pairs dataset 210 when the computed distance is less than the distance threshold.

Step 110: Remove, by the software executing on the computer processor 206, all duplicate pairs of features from the pairs dataset. A duplicate pair of features is one that contains the same two features as another pair of features.

This method produces a dataset of all distinct pairs of features where the distance between the features in each pair is less than the distance threshold. This dataset is labeled as "output dataset" in FIG. 2.

Each of the computing step, and the duplicate pair removal step, are performed by software executing on a computer processor. For ease of illustration of the method, separate instances of the same computer processor 206 are shown in FIG. 2. Details of the algorithms and processes executing on the computer processor by the software are described below.

3. Detailed Disclosure

A. Operation to Convert a Point to Cartesian Coordinates

Conversion to cartesian coordinates is the process of converting a point from a (latitude, longitude, optional altitude) coordinate system relative to the surface of a spherical body such as the earth to coordinates in three-dimensional space relative to the center of the body. This is used as a preprocessing step in binning.

Input i. A location relative to the surface of a body identified by latitude, longitude and optional altitude ii. The radius R of the earth or other body Output The Cartesian coordinates (x, y, z) of the point in three-dimensional space relative to the center of the body.

On the surface of a sphere with radius R the three-dimensional coordinates of a point specified by (latitude, longitude) are computed as follows:

$$x = R \cdot \cos(\text{latitude}) \cdot \cos(\text{longitude})$$

$$y = R \cdot \sin(\text{latitude})$$

$$z = R \cdot \cos(\text{latitude}) \cdot \sin(\text{longitude})$$

This locates the point in three-dimensional space with an origin at the center of the sphere, y-axis projecting through the north pole, x-axis projecting through longitude 0, and z-axis projecting through longitude $\pi/2$.

To incorporate altitude, the altitude is added to the radius prior to conversion.

The output of the operation to convert to Cartesian space is the three-dimensional coordinates so computed.

B. Operation to Compute the Distance Between Points

The distance between two points is used when computing the distance between two features.

Input i. Two points, p and q, each represented by latitude, longitude and optional altitude ii. The radius R of the earth or other body Output The distance between the two points Convert the points p and q to points in Cartesian space using the described method, resulting in computed points p' and q'. The Euclidean distance between the points p' and q' is equal to the chord distance between points p and q, chord(p, q), which is the length of the chord connecting two points p and q:

$$\text{chord}(p,q) = \sqrt{\Delta x^2 + \Delta y^2 + \Delta z^2}$$

where Δx is the x-axis difference, Δy is the y-axis difference, and Δz is the z-axis difference between the points p' and q'.

The output of the operation to compute the distance between two points is the value so computed.

C. Operation to Compute the Distance Between Features

Features contain one or more points. For features that contain more than one point, e.g., Polygons, define this operation to compute the distance between them. This preferred embodiment uses Hausdorff distance, but other distance methods are possible.

Input
i. Two features, A and B, relative to the surface of the body
ii. The radius R of the earth or other body Output
The distance between the features A well-understood, widely accepted metric used for geometric distance is the Hausdorff distance. The Hausdorff distance between two features A and B, denoted H(A,B) is defined as follows:

$$H(A,B) = \max\{h(A,B), h(B,A)\}$$

where h(A, B) is defined as $$h(A, B) = \max_{p \in A} \min_{q \in B} dist(p, q)$$

Where dist(p, q) is the operation to determine distance between two points described above, $\min_{q \in B}$ is the operation to find the minimum of the dist function over all points q in feature B, and $\max_{p \in A}$ is the operation to find the maximum of the dist function over all points p in feature A.

The Hausdorff distance is well-defined between features with different types (i.e., Point, LineString, and Polygon). The distance between features that have MultiPoint, MultiLineString and MultiPolygon types can be defined as the Hausdorff distance between these features as well. That is, for each point in a multi-feature, compute its minimum distance to a point in the other multi-feature, and return the maximum minimum of those distances.

The output is the distance so computed.

Optimizations:
i. An efficient approximation of Hausdorff distance is the discrete Hausdorff distance. This is done by iterating over all points defining one feature, computing the minimum distance of each point to the other feature, and returning the maximum minimum distance.
ii. There are occasions where discrete Hausdorff distance introduces error. Densification is a technique used to minimize the error so introduced.

D. Operation to Convert from Arc Distance Threshold to Chord Distance Threshold

The above operations use chord distance, but the distance threshold is provided as an arc distance. Therefore, convert the arc distance threshold to a chord distance threshold.

Input
i. An arc distance threshold T
ii. The radius R of the earth or other body Output
The chord distance threshold $T_c$ The distance between points p and q on the surface of the sphere with radius R is described by:

$$dist(p, q) = 2R \cdot \arcsin\left(\frac{chord(p, q)}{2R}\right)$$

Convert from an arc distance to a chord distance via the relationship:

$$dist(p, q) \leq T \rightarrow chord(p, q) \leq 2R \cdot \sin\left(\frac{T}{2R}\right)$$

Therefore, the chord distance threshold $T_c$ is computed as $$2R \cdot \sin\left(\frac{T}{2R}\right).$$

The output of the operation is the chord distance so computed.

E. Operation to Compute the Bins for a Numeric Value

This is the same technique as described in U.S. Pat. No. 10,613,785, but is reproduced here for clarity.

Input
i. A numeric value v
ii. A numeric threshold $T_c$
iii. A bin length parameter λ

Output
The set of linear bins matching the value

For a given threshold $T_c$ and length parameter λ, numeric binning logically divides the numeric domain into a set of overlapping bins, where the length of each bin is equal to $\lambda + T_c$ and the lower bounds of successive bins are λ apart, resulting in bins that overlap by $T_c$. That is, the bins around the origin are $\{ \ldots, [-2\lambda, -\lambda + T_c), [-\lambda, T_c), [0, \lambda + T_c), [\lambda, 2\lambda + T_c), [2\lambda, 3\lambda + T_c), \ldots \}$. Each bin is identified by the bin lower bound. The bins that match the value v are those bins that include v within their span:

$$Bin_N(v, T_c, \lambda) = \{floor(v/\lambda - T_c/\lambda), \ldots, floor(v/\lambda)\}$$

For example, with v=21, $T_c$=10 and λ=20, the matching bins are bin 0, which spans [0, 30), and bin 20, which spans [20, 50).

The result of the operation is the set of bins that match the value.

Note that for any two values v and w within $T_c$, this method ensures that the set intersection of their matching bins will contain at least one bin.

F. Operation to Compute the Bins for a Point

Input
i. A point p' in Cartesian space
ii. A distance threshold $T_c$
iii. A bin length parameter λ

Output
The set of point bins matching the point

Point binning logically divides 3-dimensional space into a set of overlapping bins, where the length of each bin in each dimension is equal to $\lambda + T_c$ and the lower bounds of successive bins in each dimension are λ apart. That is, each bin is a 3-dimensional cube with side of length $\lambda + T_c$, and the lower bounds of successive bins in each axis are λ apart, resulting in each bin overlapping with its eight neighbors by $T_c$. Each bin is identified by its minimum vertex. The point bins matching a point are determined by applying the Operation to Compute the Bins for a Numeric Value to the location of the point on each axis in turn, then taking the Cartesian product of matching numeric bins on each axis to determine matching point bins:

$$Bin_p(p', T_c, \lambda) = Bin_N(p'_x, T_c, \lambda) \times Bin_N(p'_y, T_c, \lambda) \times Bin_N(p'_z, T_c, \lambda)$$

For example, the bins overlapping the origin are determined as follows:

X axis bins are at { ... ,[-λ,[0,λ+$T_c$),[λ,2λ+$T_c$), ... }

Y axis bins are at { ... ,[-λ,$T_c$),[0,λ+$T_c$),[λ,2λ+$T_c$), ... }

Z axis bins are at { ... ,[-λ,$T_c$),[0,λ+$T_c$),[λ,2λ+$T_c$), ... }

Taking the Cartesian product of these, and labeling bins with their minimum vertex, results in the following point bins overlapping the origin:

| Identifier | $min_x$ | $min_y$ | $min_z$ | $max_x$ | $max_y$ | $max_z$ |
| --- | --- | --- | --- | --- | --- | --- |
| (-λ, -λ, -λ) | -λ | -λ | -λ | Tc | Tc | Tc |
| (-λ, -λ, 0) | -λ | -λ | 0 | Tc | Tc | λ + Tc |
| (-λ, 0, -λ) | -λ | 0 | -λ | Tc | λ + Tc | Tc |
| (-λ, 0, 0) | -λ | 0 | 0 | Tc | λ + Tc | λ + Tc |
| (0, -λ, -λ) | 0 | -λ | -λ | λ + Tc | Tc | Tc |
| (0, -λ, 0) | 0 | -λ | 0 | λ + Tc | Tc | λ + Tc |
| (0, 0, -λ) | 0 | 0 | -λ | λ + Tc | λ + Tc | Tc |
| (0, 0, 0) | 0 | 0 | 0 | λ + Tc | λ + Tc | λ + T |

Optimization: For efficiency the bin labels can be hashed to form an integer bin label.

Note that for any two points p' and q' within distance $T_c$, this method ensures that the set intersection of their matching bins will contain at least one bin.

Example

Given p'=(0, 2, 4), $T_c$=1 and λ=$T_c$, the per-axis bins that match p' are:
x: {0, 1}
y: {2, 3}
z: {4, 5}
So the spatial bins that match p' are:
{(0, 2, 4), (0, 2, 5), (0, 3, 4), (0, 3, 5), (1, 2, 4), (1, 2, 5), (1, 3, 4), (1, 3, 5)}.

G. Operation to Compute the Bins for a Feature
Input
i. A feature A
ii. The radius R of the earth or other body
iii. An arc distance threshold T
iv. An optional bin length parameter λ
Output
The set of feature bins matching the feature First, convert the arc distance threshold T to a chord distance threshold $T_c$ using the Operation to Convert from Arc Distance Threshold to Chord Distance Threshold. Next, convert the feature A to the corresponding feature A' in Cartesian coordinates by converting each point p in A to the corresponding point p' in Cartesian coordinates using the Operation to Convert a Point to Cartesian Coordinates. If the bin length parameter λ is not provided, set it equal to $T_c$.

Feature binning defines overlapping bins that encode the bounding boxes of features in 3-dimensional space. Each feature bin consists of a pair of spatial bins defined using $T_c$ and λ, and is identified by the minimum corners of the two spatial bins. These are defined by applying the method for binning points to the lower and upper vertices of the bounding box for the feature, then taking the Cartesian product of point bins to form feature bins.

The point bins matching a feature are determined by applying the Operation to Compute the Bins for a Point to the lower and upper bounds of the bounding box, then taking the Cartesian product of matching point bins to determine matching feature bins:

$$Bin_F(A, T, \lambda) = Bin_p(min_p(A'), T_c, \lambda) \times Bin_p(max_p(A'), T_c, \lambda)$$

Where $min_p(A')$ is defined as the minimum point of the bounding box of A', which can be determined by finding the minimum x, y, and z values across all points in A'; and $max_p(A')$ is defined as the maximum point of the bounding box of A', which can be determined by finding the maximum x, y, and z values across all points in A'.

Example

Given feature A' with $min_p(A')$=(0, 2, 4), $max_p(A')$=(3,5, 7), $T_c$=1 and λ=$T_c$, the point bins that match A' are:

$Bin_p(min_p(A'), T_c, \lambda)$={(0,2,4),(0,2,5),(0,3,4),(0,3,5),(1, 2,4),(1,2,5),(1,3,4),(1,3,5)}

$Bin_p(max_p(A'), T_c, \lambda)$={(3,5,7),(3,5,8),(3,6,7),(3,6,8),(4, 5,7),(4,5,8),(4,6,7),(4,6,8)}

Therefore, the feature bins matching A' are:

{((0,2,4),(3,5,7)),((0,2,4),(3,5,8)),((0,2,4),(4,6,7)),((0, 2,4),(4,6,8)),((0,2,5),(3,5,7)),((0,2,5),(3,5,8)),((0, 2,5),(4,6,7)),((0,2,5),(4,6,8)), ... ((1,3,4),(3,5, 7)),((1,3,4),(3,5,8)),((1,3,4),(4,6,7)),((1,3,4),(4,6, 8)),((1,3,5),(3,5,7)),((1,3,5),(3,5,8)),((1,3,5),(4,6, 7)),((1,3,5),(4,6,8))}

Note that, for any two features A and B with distance H(A, B)<T, the set intersection of the feature bins for A and B will contain at least one bin.

As an optimization, one can simplify feature bin identifiers by hashing the composite bin identifier to create a simple bin identifier.

As an optimization, if the bin identifiers for $min_p(A')$ and $max_p(A')$ overlap, one can filter out any combination of the bin identifier where the bin identifier for $min_p(A')$ is greater than the bin identifier for $max_p(A')$. These are redundant bin identifiers—there will always be another bin identifier that captures this case.

Only combine two bins if the bin identifier of the min axis value (i) is less than or equal to the bin identifier of the max axis value (j). The opposite case (i.e., i>j) is a redundant combination that can be safely omitted. This is because i>j implies that both the min and the max axis values belong to the intersection of these bins. This means that the entity will necessarily be associated with bin combination (j, i), making (i, j) redundant.

Note that this method applies to features that are points. The above optimization will correctly prune most feature bin identifiers for points.

H. Bin Analysis
To support efficient pair generation, count features labeled with each feature bin to create a bin size table. The size of a bin is the number of features labeled with the bin. There are two thresholds defined:
i. Bins smaller than the lower threshold are "small" bins. Pairs for a batch containing multiple small bins can be computed in the memory of a single executor.
ii. Bins between the two thresholds are "medium" bins. Pairs for one medium bin can be computed in the memory of a single executor.

iii. Bins larger than the upper threshold are "large" bins. Pairs for one large bin cannot be computed in the memory of a single executor, so it must be divided into sub-bins and the pairs computed on the sub-bins.

For a cluster of executors with 4G of RAM each, thresholds of 100 and 1000 are practical, meaning that a small bin has fewer than 100 features, a medium bin has from 100 to 1000, and a large bin has over 1000 features.

I. Pair Generation

Pair generation is the process of finding all distinct pairs of features such that there is some bin such that each feature in the pair is in that bin. A pair is generated for each combination of two features in each bin. However, because features can appear in multiple bins, this process can generate duplicate pairs. Although duplicate pairs are removed at the end of the overall process, it is beneficial to remove duplicate pairs at intermediate points of processing to save computation and data movement costs.

J. Pair Generation for Small Bins

Computing all pairs in a bin starts with computing the Cartesian product of the features in the bin. For small bins, this results in a small number of pairs (e.g. with a small bin threshold of 100, a small bin will generate fewer than 10,000 pairs), so the pairs from a batch containing multiple small bins can be computed in memory in a single executor in a distributed compute environment. The bin identifiers provide a natural means for allocating bins in batches, e.g. by taking a hash of the bin identifier modulo of the number of executors, so that 1/N of the small bins will be processed on each executor in a distributed compute environment with N executors.

The result is a set of pairs, where each pair can be identified by the two feature identifiers. As an optimization one can hash the pair of feature identifiers to create a single numeric pair identifier.

There are often many pairs that are generated from multiple bins; as an optimization, one can union and distinct the output of this phase to remove duplicate pairs before further processing. In a distributed compute environment, this can be done efficiently by partially computing the union/distinct within each partition, doing a shuffle on pair identifier, then finishing the union/distinct after the shuffle.

Once one has a distinct set of pairs, compute the actual distance between the geometries in each pair, and remove any pairs where the distance between the features in the pair is greater than $T_c$.

The result is a set of distinct pairs that meet the distance criterion, and can be stored in a pairs dataset.

K. Pair Generation for Medium Bins

All pairs from a medium bin can be processed in memory in a single executor of a distributed compute environment. Therefore, medium bins are processed one at a time on an executor, with possibly multiple executors processing medium bins in parallel. Bin identifiers provide a natural means of allocating bins to executors, e.g. by taking a hash of the bin identifier modulo of the number of executors, so that 1/N of the medium bins will be processed on each executor in a distributed compute environment with N executors.

Computing the pairs in a medium bin starts with computing the Cartesian product of the features in the bin. The result is a set of pairs, where each pair can be identified by the two feature identifiers. As an optimization one can hash the pair of feature identifiers to create a single numeric pair identifier. Then filter out those pairs where the distance between the features in the pair is greater than $T_c$.

The result is a set of distinct pairs that meet the distance criterion, and can be stored in a pairs dataset. Store these resulting pairs in the pairs dataset. There will be pairs that are redundant with those coming from small bins or other medium or large bins, but those are removed in a later processing step.

L. Pair Generation for Large Bins

All pairs for a large bin can't be processed in the memory of a single executor. To compute all pairs in a large bin, one must divide it into sub-bins, each of which can be processed in the memory of a single executor.

Computing the pairs in a large bin starts with randomly dividing the features in the bin into sub-bins, each with a number of features below the large bin threshold. Processing then proceeds in two phases:

1. Run Pair Generation for Medium Bins on each sub-bin
2. For each distinct combination of two distinct sub-bins, run the Medium bin algorithm on the two sub-bins together. As an optimization, when computing the Cartesian product of feature pairs only compute pairs of features where each feature comes from a distinct sub-bin; the pairs of features originating from the same sub-bin are computed in phase 1.

The result is a set of distinct pairs that meet the distance criterion, and can be stored in a pairs dataset. Store these resulting pairs in the pairs dataset. This is guaranteed to produce each pair from the large bin. There may be pairs that are redundant with those coming from small, medium or other large bins. Those are removed in the final step.

M. Finalizing Pairs

To remove any remaining redundant pairs, run a union/distinct across the pairs in the pairs dataset. This produces a final dataset containing all pairs that meet the distance criterion, with no duplicate pairs.

N. Modifications for Relative Distance

Operation to Compute the Relative Distance Between Features

It is often useful to compare the distance between objects relative to their size; for example, a 10 meter distance between two shapes representing bus stops is much more significant than a 10 meter distance between two shapes representing cities.

Input
i. Two features, A and B, relative to the surface of the body
ii. The radius R of the earth or other body Output The relative distance between the features Let D(A) be a function computing the diameter of a feature. For example:

$$D(A) = \max_{i,j}(\text{dist}(p_i, p_j))$$

for all points $\{p_i, p_j\}$ in feature A. An approximation of diameter is the diagonal of the bounding box of feature A.

Define relative distance between two features as:

$$\text{relative\_distance}(A, B) = \frac{\text{distance}(A, B)}{\min(D(A), D(B))}$$

Dividing by the minimum diameter rather than the maximum diameter avoids matching features with large size difference. For example, when computing the relative distance between a bus stop and the city it is in, dividing by the diameter of the bus stop yields a large relative distance, which correctly represents the dissimilarity in size; whereas dividing by the diameter of the city makes the two appear very close despite their enormous size difference.

Note that if either feature is a single point, the denominator will be zero and the relative distance will therefore be undefined. For this case, define the relative distance to be infinite, with the exception that if both features are single points and the points are equal, then the relative distance between them is zero:

$$\text{relative\_distance}(A, B) = \left\{0, \text{ if } A = B; \infty, \text{ if } \min(D(A), D(B)) = 0; \text{ else } \frac{\text{distance}(A, B)}{\min(D(A), D(B))}\right\}$$

The output is the relative distance so computed.

O. Operation to Comput the Relative Spatial Similarity Between Features

Many algorithms prefer a similarity metric to a distance metric. It is desirable to have a similarity metric that is at its maximum when the distance between two features is zero, and decreases as the distance between them increases.

Input
 i. Two features, A and B, relative to the surface of the body
 ii. The radius R of the earth or other body
Output
The similarity between the features Negative relative distance satisfies the above requirements:

$$\text{relative\_similarity}(A,B) = -\text{relative\_distance}(A,B)$$

If one further desires a similarity metric in the range [0, 1], define a scaled relative distance. One such definition is:

$$RS(A, B) = \max\left(0, 1 - \frac{\text{dist}(A, B)}{\min(D(A), D(B))}\right)$$

which is zero when the distance between two shapes is larger than the diameter of the smaller shape.

P. Operation to Compute the Relative Spatial Bins for a Feature

Input
1. A feature A
2. A distance function distance(A, B). For example, Hausdorff distance.
3. A diameter function D(A)
4. A relative similarity threshold S, in the interval [0, 1]
Output
The set of relative spatial bins matching the feature The threshold associated with relative similarity, denoted S, is in range [0, 1]. Let T be equal to 1-S. Let A and B be two features.

$$\text{relative\_similarity}(A,B) \geq S$$

where S>0, implies that $$\text{distance}(A,B) \leq T \min(D(A),D(B))$$

Based on the above description of the binning for features, this implies that $$|\min_x(A) - \min_x(B)| \leq T \min(D(A),D(B))$$

and $$|\max_x(A) - \max_x(B)| \leq T \min(D(A),D(B))$$

which implies that $$|\Delta x(A) - \Delta x(B)| \leq 2T \min(D(A),D(B))$$

where $\Delta x(A) = \max_x(A) - \min_x(A)$, and $\Delta x(B)$ is defined similarly.

Similarly, one can prove that relative_similarity(A,B)≥S implies that $$|\Delta y(A) - \Delta y(B)| \leq 2T \min(D(A),D(B))$$

and $$|\Delta z(A) - \Delta z(B)| \leq 2T \min(D(A),D(B))$$

Since $D(A)^2 = dx(A)^2 + \Delta y(A)^2 + \Delta z(A)^2$, and assuming without loss of generality that $D(A) \leq D(B)$, one can infer that relative_similarity(A, B)≥S implies that $$D(B)^2 - D(A)^2 = \Delta x(B)^2 - \Delta x(A)^2 + \Delta y(B)^2 - \Delta y(A)^2 + \Delta z(B)^2 - \Delta z(A)^2 \leq (\Delta x(A) + 2T D(A))^2 - \Delta x(A)^2 + (\Delta y(A) + 2T D(A))^2 - \Delta y(A)^2 + (\Delta z(A) + 2T D(A))^2 - \Delta z(A)^2 \leq 4T D(A)\Delta x(A) + 4T^2 D(A)^2 + 4T D(A)\Delta y(A) + 4T^2 D(A)^2 + 4T D(A)\Delta z(A) + 4T^2 D(A)^2$$

And since $\Delta x(A) \leq D(A)$ (and similarly $\Delta y(A)$ and $\Delta z(A)$)

$$D(B)^2 - D(A)^2 \leq (12T + 12T^2)D(A)^2$$

i.e., $$1 \leq \frac{D(B)}{D(A)} \leq \sqrt{(1 + 12T + 12T^2)}$$

Or in general, $$1 \leq \frac{\max(D(A), D(B))}{\min(D(A), D(B))} \leq \sqrt{(1 + 12T + 12T^2)}$$

Let $\alpha = \sqrt{(1+12T+12T^2)}$. Partition the diameter length domain into disjoint ranges with boundaries . . . , $1/\alpha$, 1, $\alpha$, $\alpha^2$, $\alpha^3$, . . . . Let $B_i$ indicate the above described operation to compute bins using absolute distance with threshold equal to $T\alpha^i$. For each object A with diameter length D(A), compute i=ceil(log(D(A))/log($\alpha$)). Next, use $B_i$ and $B_{i-1}$ to compute bins for this feature. The final set of bin identifiers is the union of the two sets of bin identifiers, prefixed with the index of the B (either i or i-1) that generated each bin.

In the following, one can prove that this binning model has zero false negatives. Let A and B be two features with relative_similarity(A, B)≥S. Without loss of generality, assume that D(A)≤D(B).

Since $$1 \leq \frac{D(B)}{D(A)} \leq \alpha,$$

it follows that 0≤log(D(B))/log($\alpha$)−log(B(A))/log($\alpha$)≤1. A and B must have bins computed using one common $B_i$ where i=ceil(log(D(A))/log($\alpha$)), which is equal to either ceil(log(D(B))/log($\alpha$))−1 or ceil(log(D(B))/log($\alpha$)).

Also, $$H(A,B) \leq TD(A) \leq T\alpha^i$$

which means that $B_i$ will generate overlapping bin identifiers for A and B.

The result of the operation is the set of relative spatial bins so computed.

Q. Optimizing Bin Length Parameter

An optimization is to adjust bin length parameter $\lambda$, typically by increasing the side length of each bin beyond 2T. That is, one increases the parameter λ to be greater than T. This will reduce the number of bins per feature, though increasing this beyond a certain point will have a negative impact on the overall runtime since the total number of compared pairs grows quadratically with the number of features per bin. In practice, a value of λ=5T performs well on commodity hardware with datasets representing features on standard city maps, using T in the range 10 m-50 m.

Figure 3:
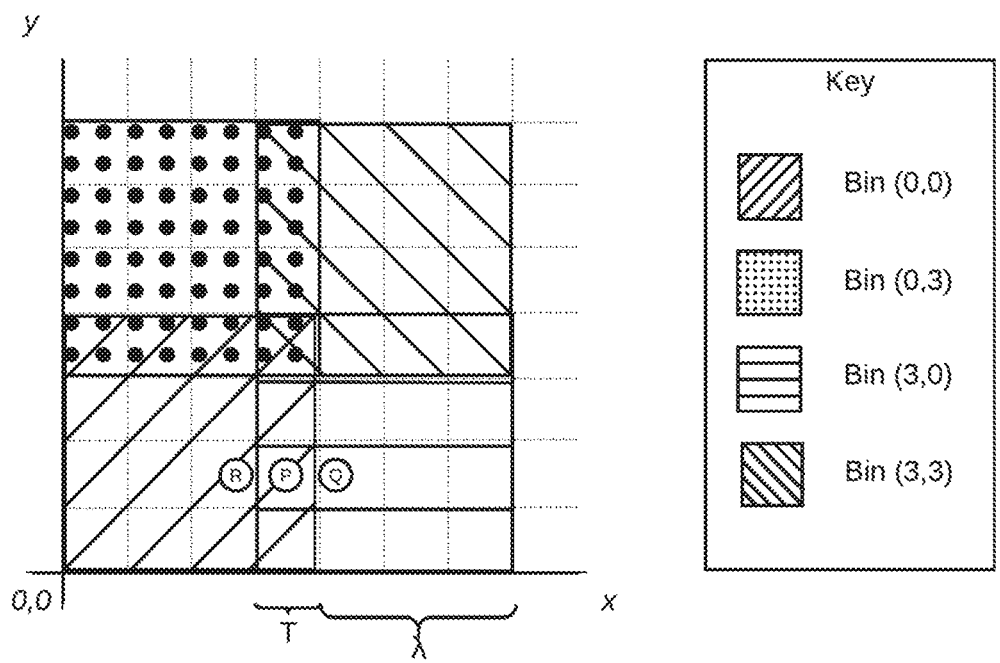
FIGS. 3 and 4 are drawings for illustrating features of the present invention.

FIG. 3 illustrates two-dimensional binning of points. The grid size represents the distance threshold T. For this illustration, λ=3T. Four bins are illustrated, and identified by their minimum (X, Y) coordinates. Points P, Q, and R are to be binned. Let Binp represent the operation to compute the spatial bins for a point in two dimensions. Then: Binp(P, T)={(0,0),(3,0)}, Binp(Q, T)={(3,0)}, and Binp(R, T)={(0, 0)}. Then Binp(P, T)∩Binp(Q, T)={(3,0)}; Binp(P, T)∩Binp(R, T)={(0,0)}, and Binp(Q, T)∩Binp(R, T)=∅.

Figure 4:
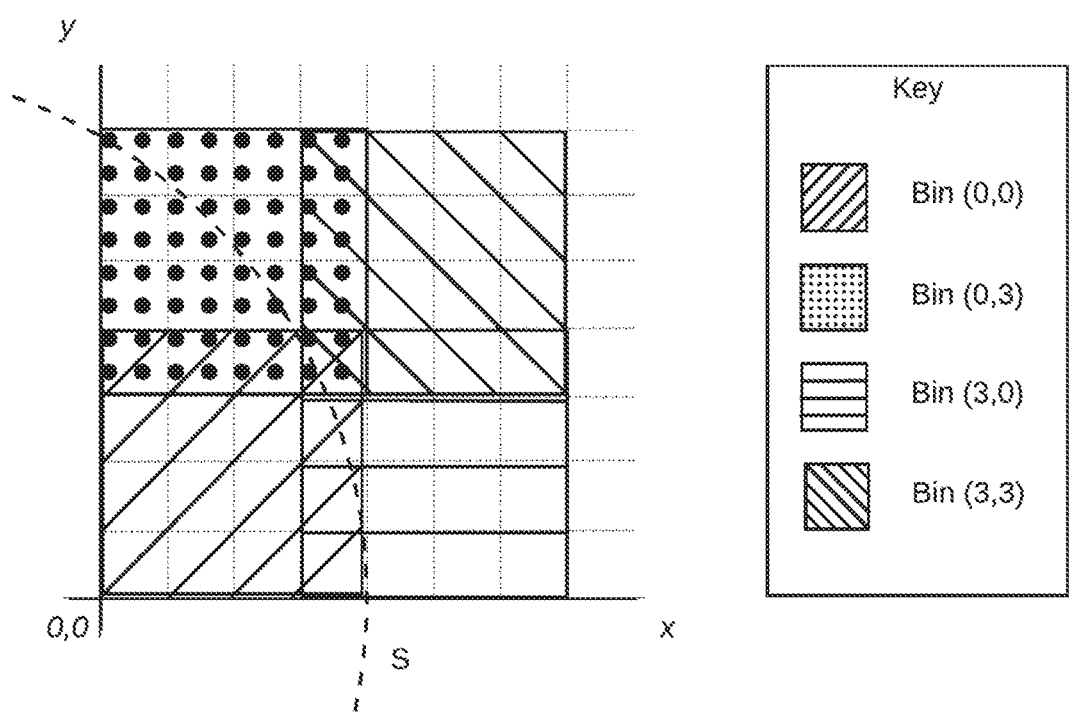

FIG. 4 shows Surface S that intersects bin (3,0) only in the region of overlap with bin (0,0). As an optimization, if all points to be binned lie on surface S, bin (3, 0) (and any bin where intersection with surface S overlaps with another bin) can be omitted.

Figure 5:
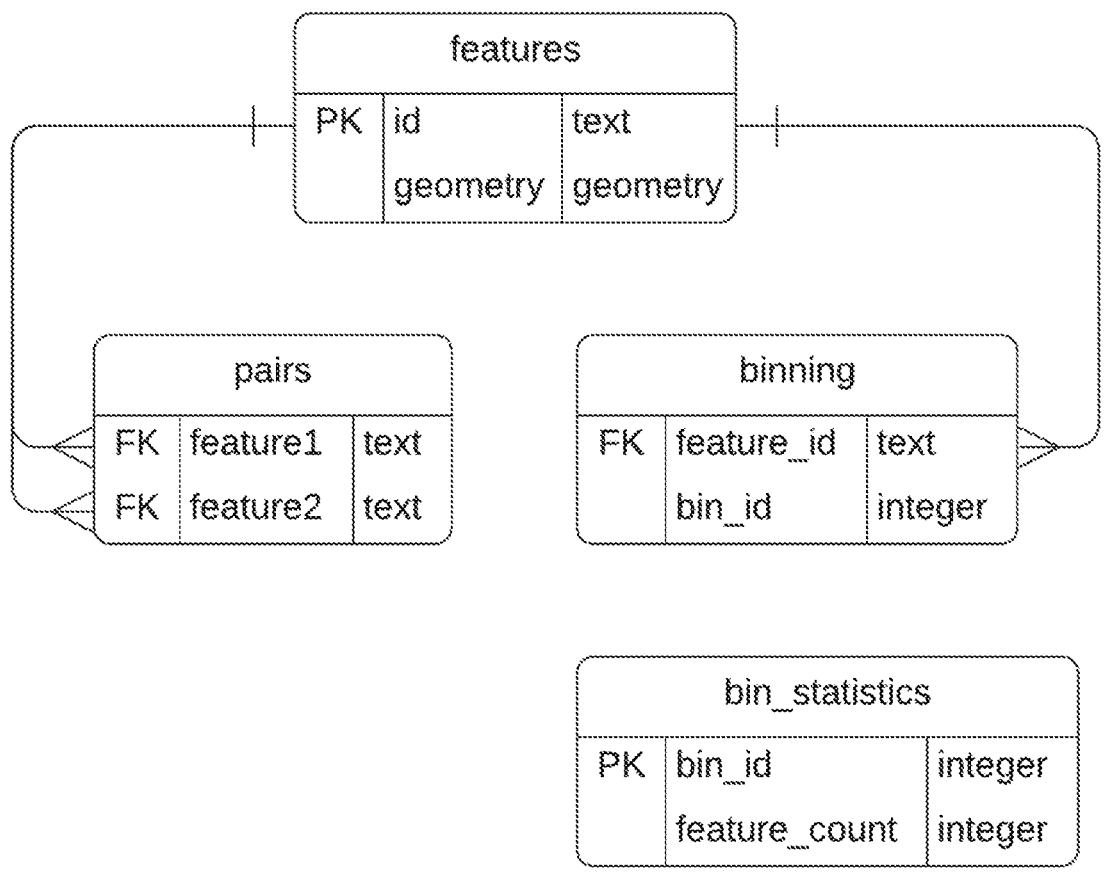
FIG. 5 is an entity relationship diagram (ERD) for implementing one preferred embodiment of the present invention.

FIG. 5 is an ERD that shows schemas of the datasets for implementing one preferred embodiment of the present invention. The following explanation is provided regarding FIG. 5.

Table Schemas

Feature Collection:

(i) Id: string or number; primary key (ii) Geometry: geometry as described in ISO 19125-1:2004

(iii) Additional attributes as required, as described in ISO 19125-1:2004

Binning Dataset:

(i) Feature Id: string or number; foreign key to Feature Collection Id (ii) Feature Geometry: geometry as described in ISO 19125-1:2004

(iii) Bin Id: number or array of numbers as required by the bin computation method Pairs Dataset:

(i) Feature 1 Id: string or number; foreign key to Feature Collection Id (ii) Feature 2 Id: string or number; foreign key to Feature Collection Id (iii) Feature 1 Geometry: geometry as described in ISO 19125-1:2004

(iv) Feature 2 Geometry: geometry as described in ISO 19125-1:2004

An open source version of "ISO 19125-1:2004 Geographic information—Simple feature access—Part 1: Common architecture" is "OpenGIS® Implementation Standard for Geographic information—Simple feature access—Part 1: Common architecture," available from Open Geospatial Consortium, Inc. This open source version is a suitable substitute for ISO 19125-1:2004.

The present invention may be implemented with any combination of hardware and software. If implemented as a computer-implemented apparatus, the present invention is implemented using means for performing all of the steps and functions described above.

When implemented in software, the software code can be executed on any suitable processor or collection of processors, whether provided in a single computer or distributed among multiple computers.

The present invention can also be included in an article of manufacture (e.g., one or more tangible computer program products) having, for instance, non-transitory computer readable storage media. The storage media has computer readable program code stored therein that is encoded with instructions for execution by a processor (e.g., computer processor 206) for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s)/processor(s) used herein (e.g., computer processor 206) may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

Such computers/processors may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in non-transitory computer-readable media in any suitable form. For simplicity of illustration, data structures may be shown to have fields that are related through location in the data structure. Such relationships may likewise be achieved by assigning storage for the fields with locations in a non-transitory computer-readable medium that conveys relationship between the fields. However, any suitable mechanism may be used to establish a relationship between information in fields of a data structure, including through the use of pointers, tags or other mechanisms that establish relationship between data elements.

The scope of the present invention thus further includes a tangible computer program product for producing a dataset of all distinct pairs of features where a distance between the features in each pair is less than a distance threshold, wherein the computer program product comprises non-transitory computer-readable media encoded with instructions for execution by a processor, such as computer processor 206, to perform the methods described above.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

Various embodiments of the invention have been presented above. However, the invention is not intended to be limited to the specific embodiments presented, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

What is claimed is:

1. A computer-implemented method for producing a dataset of all distinct pairs of features where a distance between the features in each pair is less than a distance threshold, and wherein the features are geographic features used in geographic information systems, the method comprising:
   (a) defining a distance function that provides a distance between two features, the features being the geographic features used in geographic information systems;
   (b) defining a distance threshold that specifies a maximum distance between the two features for the two features to be included as a pair in the produced dataset;
   (c) for each feature in a collection of features:
       (i) computing, by software executing on a computer processor, bins of the feature using the distance threshold, such that, for any two features within the distance threshold, a set intersection of the bins for the two features contains at least one bin, and
       (ii) storing the computed bins for the feature in a binning dataset;
   (d) for each bin in the binning dataset, computing, by the software executing on the computer processor, all distinct pairs of features within the bin;
   (e) for each distinct pair of features within the bin:
       (i) computing, by the software executing on the computer processor, a distance between the distinct pair of features using the distance function, and
       (ii) storing the distinct pair of features in a pairs dataset when the computed distance is less than the distance threshold; and
   (f) removing, by the software executing on the computer processor, all duplicate pairs of features from the pairs dataset, wherein a duplicate pair of features is one that contains the same two features as another pair of features, thereby producing a dataset of all distinct pairs of features where the distance between the features in each pair is less than the distance threshold.

2. The method of claim 1 wherein the bin computing in step (a)(i) further includes a bin length parameter.

3. The method of claim 1 wherein the bins are relative spatial bins.

4. The method of claim 1 wherein the bins include at least some small bins, and wherein in step (b), all distinct pairs of features for multiple small bins are computed together, and wherein a small bin is a bin having less than 100 features.

5. The method of claim 1 wherein the bins include at least some large bins, and wherein in step (b), all distinct pairs of features for the large bins are computed by subdividing the large bins into sub-bins, and then computing all distinct pairs of features on the sub-bins, and wherein a large bin is a bin having more than 1000 features.

6. A tangible computer program product for producing a dataset of all distinct pairs of features where a distance between the features in each pair is less than a distance threshold, wherein a distance function is defined that provides a distance between two features, and wherein the distance threshold is defined that specifies a maximum distance between the two features for the two features to be included as a pair in the produced dataset, and wherein the features are geographic features used in geographic information systems, wherein the computer program product comprises non-transitory computer-readable media encoded with instructions for execution by a computer processor to perform the method of:
   (a) for each feature in a collection of features:
       (i) computing bins of the feature using the distance threshold, such that, for any two features within the distance threshold, a set intersection of the bins for the two features contains at least one bin, the features being the geographic features used in geographic information systems, and
       (ii) storing the computed bins for the feature in a binning dataset;
   (b) for each bin in the binning dataset, computing all distinct pairs of features within the bin;
   (c) for each distinct pair of features within the bin:
       (i) computing a distance between the distinct pair of features using the distance function, and
       (ii) storing the distinct pair of features in a pairs dataset when the computed distance is less than the distance threshold; and
   (d) removing all duplicate pairs of features from the pairs dataset, wherein a duplicate pair of features is one that contains the same two features as another pair of features, thereby producing a dataset of all distinct pairs of features where the distance between the features in each pair is less than the distance threshold.

7. The tangible computer program product of claim 6 wherein the bin computing in step (a)(i) further includes a bin length parameter.

8. The tangible computer program product of claim 6 wherein the bins are relative spatial bins.

9. The tangible computer program product of claim 6 wherein the bins include at least some small bins, and wherein in step (b), all distinct pairs of features for multiple small bins are computed together, and wherein a small bin is a bin having less than 100 features.

10. The tangible computer program product of claim 6 wherein the bins include at least some large bins, and wherein in step (b), all distinct pairs of features for the large bins are computed by subdividing the large bins into sub-bins, and then computing all distinct pairs of features on the sub-bins, and wherein a large bin is a bin having more than 1000 features.

\* \* \* \* \*